United States Patent [19]

Schütz et al.

[11] Patent Number: 4,647,730
[45] Date of Patent: Mar. 3, 1987

[54] ROTARY ISOLATING SWITCH, ESPECIALLY ENCAPSULATED ROTARY ISOLATING SWITCH

[75] Inventors: Willi Schütz, Aarau; Robert Valle, Suhr, both of Switzerland

[73] Assignee: Sprecher & Schuh AG, Aarau, Switzerland

[21] Appl. No.: 783,544

[22] Filed: Oct. 3, 1985

[30] Foreign Application Priority Data

Oct. 12, 1984 [CH] Switzerland .......................... 4896/84

[51] Int. Cl.[4] ............................................ H01H 19/10
[52] U.S. Cl. ..................................... 200/6 R; 200/15
[58] Field of Search ............. 200/50 A, 15, 6 R, 16 F, 200/162

[56] References Cited

U.S. PATENT DOCUMENTS 3,202,775  8/1965  Tillson ............................. 200/162 X
4,467,161  8/1984  Fox et al. ............................ 200/281

Primary Examiner—A. D. Pellinen
Assistant Examiner—Morris Ginsburg
Attorney, Agent, or Firm—Werner W. Kleeman

[57] ABSTRACT

For each phase to be switched, there is provided at least one pair of fixed contacts consisting of an upper fixed contact and a lower fixed contact as well as one rotary or movable contact. The rotary contact is rotatable about an axis of rotation and is in constant engagement with one of the fixed contacts. The rotary or movable contact is supported on a support made of insulating material. The support is also rotatable. To reduce the torsion moment or torque required for turning the rotary contact to a minimum, the rotatable support possesses, in the vicinity of the rotary or movable contacts, a cranked or bent section in the form of a crank shaft in which an open-ended recess or aperture is provided for each contact. There recesses or apertures carry the rotary or movable contact. Each rotary or movable contact projects at both ends beyond the associated recess or aperture and the axis of rotation passes through one end section of the rotary or movable contacts as well as the end section of one of the fixed contacts.

16 Claims, 7 Drawing Figures

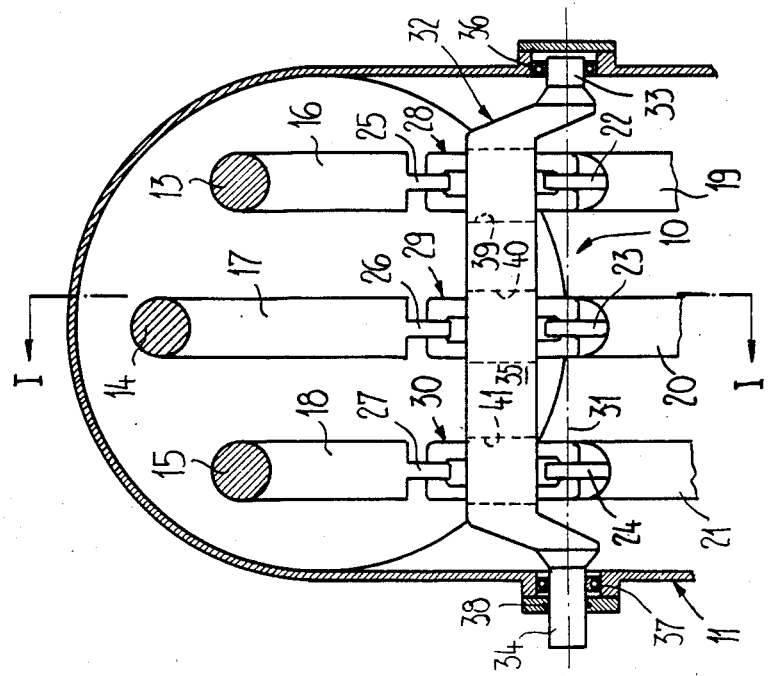
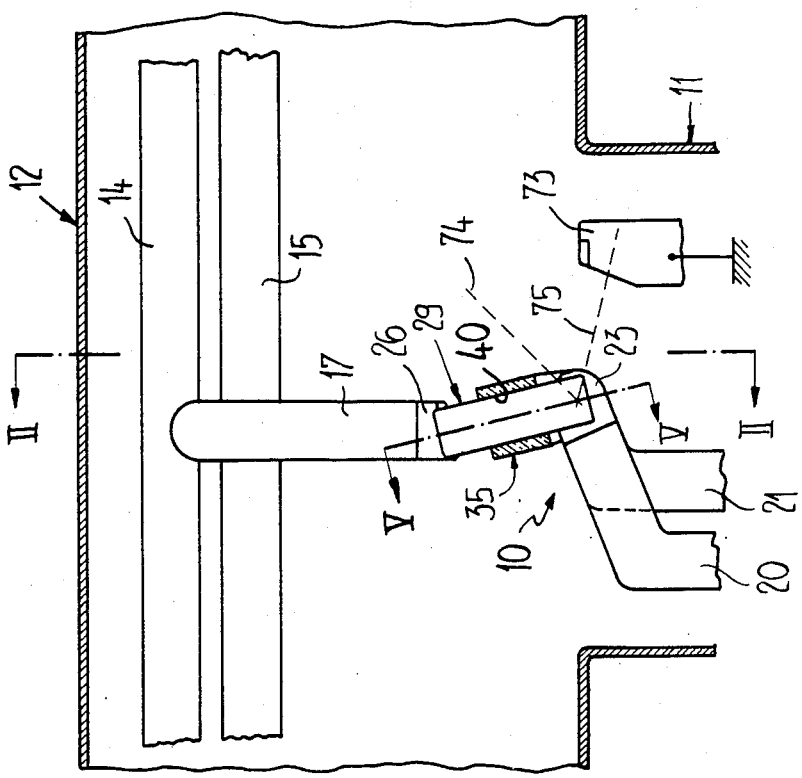
Fig. 2
Fig. 1

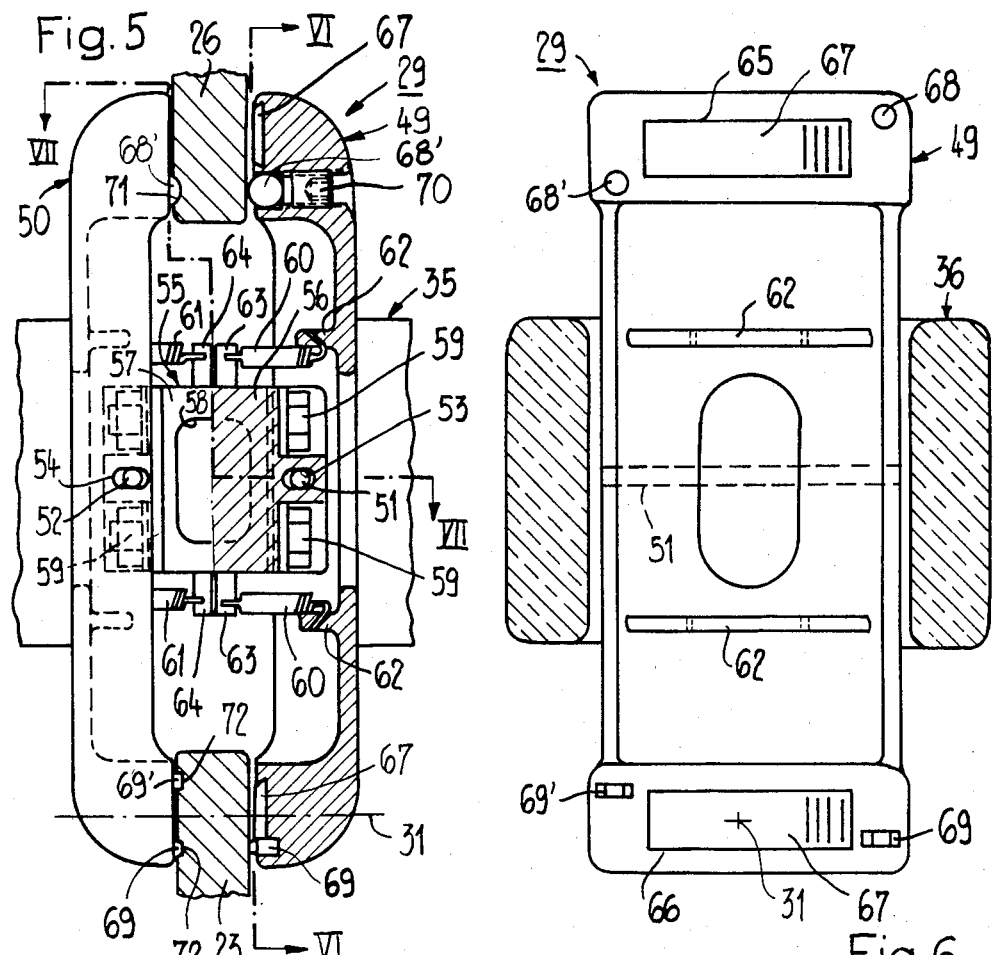
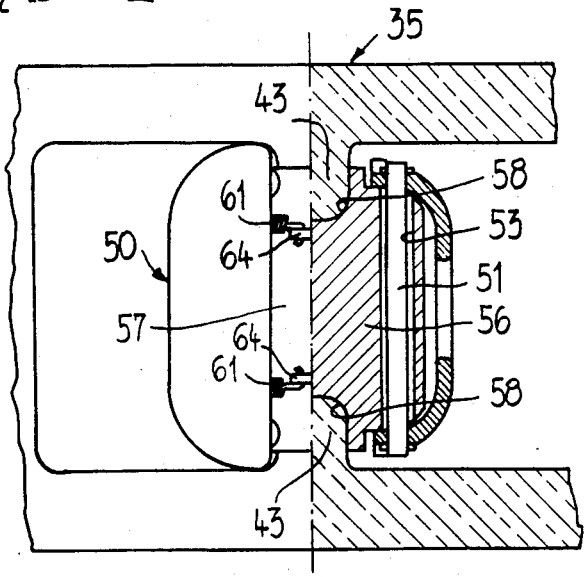

ROTARY ISOLATING SWITCH, ESPECIALLY ENCAPSULATED ROTARY ISOLATING SWITCH

BACKGROUND OF THE INVENTION

The present invention broadly relates to a new and improved rotating or rotary isolating switch, especially an encapsulated or enclosed rotating or rotary isolating switch.

Generally speaking, the rotating or rotary isolating switch comprises at least two fixed contacts per switched phase, each such fixed contact consisting of one upper fixed or stationary contact and one lower fixed or stationary contact, and a rotary or movable contact rotatable about an axis of rotation. This rotary or movable contact is in constant engagement with the lower fixed or stationary contact and, by its rotation about the axis of rotation, can be brought into and out of engagement with the upper fixed or stationary contact. The rotary or movable contact is supported on a support made of electrically insulating material. The support is rotatable about the above mentioned axis of rotation and each rotary or movable contact projects radially from this support.

Such a rotating or rotary isolating switch in enclosed or encapsulated and three-pole execution is known from the German Patent Publication No. 2,924,630, published Jan. 29, 1981. In this rotating or rotary isolating switch three movable contacts, each constructed in the form of a knife, are anchored against relative rotation on a straight or linear hexagonal shaft made of insulating material. The contour of each of these movable contacts possesses two extensions or bulges which extend radially outwards. The first extension or bulge is normally always in engagement with a fixed contact. This fixed contact possesses two contact surfaces which lie opposite each other and which are in the form of a circular ring segment. The above mentioned first extension or bulge of the movable contact engages in a frictional manner between these two contact surfaces. Analogously, the second extension of the movable contact engages between facing contact surfaces of a second fixed contact in a frictional manner. These contact surfaces of the second fixed contact do not, however, possess the form of a circular ring segment in order that the second extension of the movable contact may also be brought out of contact with or disengaged from the second fixed contact so as to bring about a separation or mutual isolation of the two fixed contacts.

During a switching movement both extensions of the movable contacts therefore have to carry out a frictional or surface wiping movement in relation to the contact surfaces of the fixed contacts. Since all these contact surfaces are arranged radially remote from a common axis of rotation determined by the hexagonal shaft, the hexagonal shaft has to exert a considerable turning moment or torque on the movable contacts and an appropriate drive means for driving or turning the hexagonal shaft has to apply this turning moment or torque. Furthermore, each movable contact of this known rotating or rotary isolating switch is anchored by means of two half shells which conjointly surround the hexagonal shaft and which are biased or preloaded together. One of the half shells is fastened directly to the movable contact, for instance by welding. The half shells only engage with the outside surface of the hexagonal shaft. Therefore the risk exists that with time play will develop in the direction of rotation between the hexagonal shaft, which is made of insulating material, and the respective movable contacts which are anchored thereto.

SUMMARY OF THE INVENTION

Therefore, with the foregoing in mind it is a primary object of the present invention to provide a rotating or rotary isolating switch, especially an enclosed or encapsulated rotating or rotary isolating switch, which does not exhibit the aforementioned drawbacks and shortcomings of the prior art constructions.

A further important object of the present invention is to provide a rotating or rotary isolating switch of the above mentioned type which for its operation requires a smaller turning moment or torque and in which the risk of the existence or arisal of play in the direction of rotation between the movable contact and its support is greatly reduced.

Now in order to implement these and still further objects of the invention, which will become more readily apparent as the description proceeds, the apparatus of the present invention for a rotating or rotary isolating switch, especially an enclosed or encapsulated rotating or rotary isolating switch, is manifested by the features that a rotatable cranked support is arranged in the region of the rotary or movable contact and possesses a section having the form of a cranked or bent crank shaft in which a recess or aperture is formed which passes through the bent crank shaft and carries the rotary or movable contact. The rotary or movable contact projects on both sides beyond the through-passing or open-ended recess or aperture. The axis of rotation of the rotatable cranked support passes through the end section of the rotary or movable contact as well as the end section of the lower fixed or stationary contact.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 shows a longitudinal section taken along the line I—I of FIG. 2 and through a busbar conduit to which is connected an illustrative embodiment of a three-pole rotary isolating switch according to the invention;

FIG. 2 schematically shows a section taken approximately along the line II—II of FIG. 1;

FIG. 5 shows at the right hand side thereof a section taken along the line V—V of FIG. 1 and on the left hand side a side-view of one half of the movable contact an on a further enlarged scale;

FIG. 6 shows a front view of one of the rotary or movable contacts seen approximately from the plane designated by the line VI—VI in FIG. 5, with two alternate embodiments of pre-contacts; and FIG. 7 shows a section taken along the line VII—VII of FIG. 5.

DETAILED DESCRIPTION OF THE PREFERRED EMBODIMENTS

Figure 3:
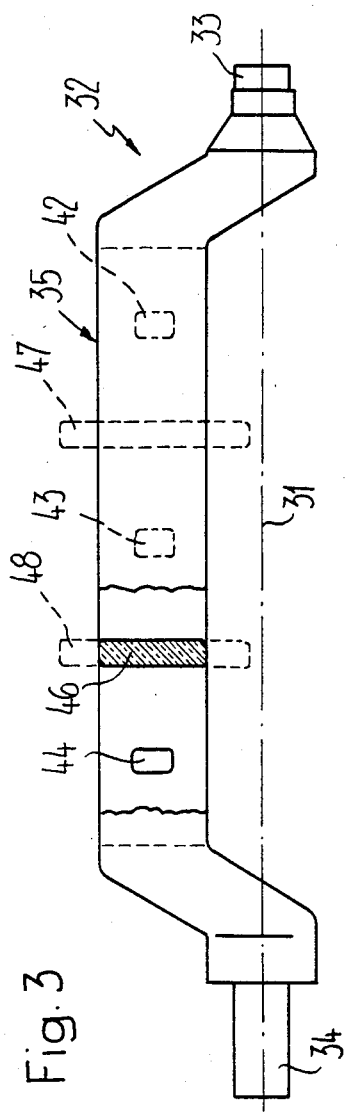
FIG. 3 shows a partly sectional side view of a support for movable contacts of the rotary isolating switch according to FIGS. 1 and 2 on an enlarged scale.

Describing now the drawings, it is to be understood that to simplify the showing thereof, only enough of the structure of the exemplary embodiments of rotating or rotary isolating switch, especially an enclosed or encapsulated rotating or rotary isolating switch, has been illustrated therein as is needed to enable one skilled in the art to readily understand the underlying principles and concepts of the present invention. Turning now specifically to FIG. 1 and 2 of the drawings, the structure depicted by way of example and not limitation will be seen to comprise a rotating or rotary isolating switch 10 which is arranged in line with a branch or junction 11 of a busbar conduit 12.

The branch 11 as well as the busbar conduit 12 are made of metal and are component parts of an enclosure or encapsulation for a protective-gas-insulated isolating switching apparatus. Within the busbar conduit 12 there run or extend three busbars 13, 14 and 15. In line with the branch 11 there is connected to each busbar 13, 14 and 15 a respective upper branch conductor 16, 17 and 18 extending in the direction of the branch 11. In the branch 11 itself there are also provided three respective lower branch conductors 19, 20 and 21 which, for example, lead off to a cable branch or to another busbar rail not shown in its particular details in FIG. 1.

The upper free ends of the lower branch conductors 19, 20 and 21 are constructed as knife-type fixed lower contacts 22, 23 and 24, respectively. The lower ends of the upper brangh conductors 16, 17 and 18 are also constructed as knife-type upper fixed contacts 25, 26 and 27, respectively. The insulating support elements which in FIGS. 1 and 2 support the busbars 13, 14 and 15, the upper branch conductors 16, 17 and 18, and the lower branch conductors 19, 20 and 21, in relation to each other and in relation to the busbar conduit 12, and in relation to the branch 11, are not depicted in their particular details here in order to simplify the illustration of the drawrngs.

The pairs of lower and upper fixed contacts 22, 25 and 23, 26 as well as 24, 27 each cooperate with a respective rotary or movable contact 28, 29 and 30. These rotary or movable contacts 28, 29 and 30 are in constant engagement with the respective corresponding lower fixed contacts 22, 23 and 24.

The rotary or movable contacts 28, 29 and 30 are supported, in a manner still to be described, in a cranked support 32 which is rotatable in forward and reverse direction through a limited angle of rotation about an axis of rotation 31. The cranked support 32 is constructed of electrically insulating material. This cranked support 32 possesses at its ends two stub-shafts 33 and 34 which are coaxial with the axis of rotation 31 and a section 35 arranged therebetween which is cranked or bent in the form of a crankshaft throw or crankpin, i.e. resembling a crankshaft. The stub-shafts 33 and 34 are each rotatably mounted in respective ball, roller or other suitable low-friction bearings 36 and 37 (FIG. 2). The roller bearings 36 and 37 are mounted in the conduit at the beginning of the branch 11. Additionally, the stub shaft 34 is conducted out through a sealing device 38 and is connected to a drive mean not depicted here in its particular details.

Figure 4:
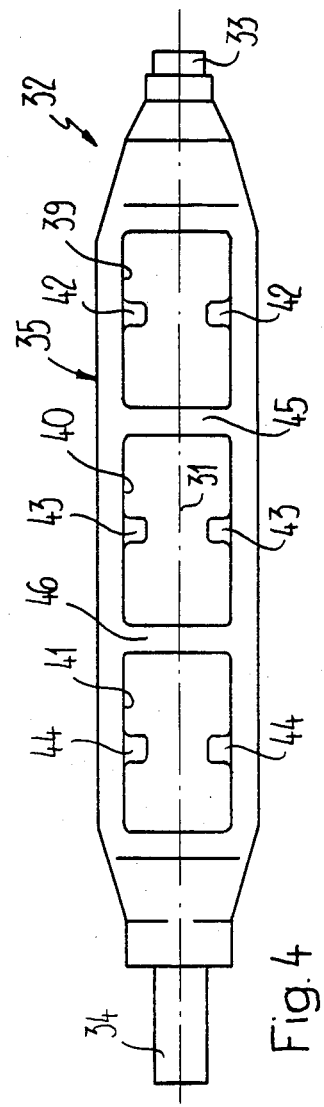
FIG. 4 shows a plan view of the arrangement of FIG. 3.

As can be seen from FIGS. 3 and 4, the cranked support 32, which is preferably constructed as a single casting of insulating material, possesses in its cranked or bent section 35 three through-passing or open-ended recesses or apertures 39, 40 and 41 which extend substantially perpendicular to the axis of rotaticn 31. From FIGS. 1 and 2 it can be seen that one of the rotary or movable contacts 28, 29 and 30 is carried in each of these recesses or apertures 39, 40 and 41. This will be further described below.

From FIGS. 1 and 2 it can also be seen that the axis of rotation 31, about which the cranked support 32 is rotatable, penetrates or passes through the ends of the rotary or movable contacts 28, 29 and 30 which project below the cranked or bent section 35 as well as through the ends of the associated lower fixed contacts 22, 23 and 24. It is therefore evident that the amount of turning or torsion moment or torque which must be applied to move the rotary or movable contacts 28, 29 and 30 in relation to the fixed contacts 22 through 27, is a minimum.

From FIGS. 3 and 4 it is evident that in the longitudinal center of each of the mutually confronting inner longitudinal walls of each of the recesses 39, 40, and 41 there is molded or formed a respective support nose or lug 42, 43 and 44, whose purpose will be explained hereinafter. Also there can be seen from FIG. 3 that partition walls 45 and 46 provided between the recesses 39 and 40 as well as between the recesses 40 and 41, respectively, can be extended or lengthened on both sides radially beyond the cranked or bent section 35 to form an additional insulating or isolating shield, as is shown by the respective dotted lines 47 and 48.

All of the rotary or movable contacts 28, 29 and 30 are constructed in the same way, so that the description in connection with FIGS. 5, 6 and 7 can be restricted to the rotary or movable contact 29.

There is recognizable in FIGS. 5, 6 and 7 a portion of the cranked or bent section 35 of the cranked support 32 and the rotary or movable contact 29 which is carried in its recess or aperture 40, as well as the lower fixed contact 23 and upper fixed contact 26 cooperating with the rotary or movable contact 29. The position of the axis of rotation 31 is shown as a dot-dash line in FIG. 5, whereas in FIG. 6 it is shown as a point.

The rotary or movable contact 29 is built up essentially of two substantially identical, in outline somewhat rectangular, shell-like contact pieces or members 49 and 50 which are arranged with open ends or faces confronting each other. In the longitudinal edges which lie opposite each other there are anchored—as is shown in FIG. 7 for the contact member 49—two ends of an entrainment connection pin 51 or, respectively, 52 (FIG. 5). These two entrainment connection pins 51 and 52 span a depression or void in the shell-like contact members 49 and 50, respectively. In their middle portions the entrainment connection pins 51 and 52 each pass through or penetrate respective entrainment connection slots 53 and 54 extending parallel to the axis of rotation 31. Each of these entrainment connection slots 53 and 54 is formed in a respective support block half 56 and 57 of a support block 55. Both support block halves 56 and 57 are connected with each other by means of threaded connections 59. Both support block halves 56 and 57 have essentially the same shape, yet are arranged in mirror-image relationship. Both support block halves 56 and 57 possess depressions or grooves 58 (FIG. 7) which enclose or engage, practically without play the support noses or lugs 43 provided in the recess or aperture 40.

In this manner the support block 55 is form-locked or positively connected in every direction with the cranked or bent section 35 of the cranked support 32. On the other hand, the two contact members 49 and 50 each possess a freedom of movement with respect to the cranked or bent section 35 of the cranked support 32 in a single direction, namely in the direction of the axis of rotation 31, i.e. towards each other or away from each other.

The dimension or extent of these degrees of freedom of movement of the contact pieces 49 and 50 with respect to each other is limited by the length of the entrainment connection slots 53 and 54. On the other hand, the rotating or turning movement of the support block 55 effected by the cranked or bent section 35 of the cranked support 32 is transferred through the entrainment connection slots 53 and 54 and the entrainment connection pins 51 and 52 to the contact members 49 and 50 practically without play. Each of these contact pieces or members 49 and 50 is prestressed or biased in the direction toward the respective associated half 56 or 57 of the support block 55 by means of respective tension springs 60 and 61. For this purpose the tension springs 60 and 61 are engaged with or suspended at one end to a rib 62 which is formed in the depression of the corresponding contact piece 49 and 50, respectively (rib 62 is only referenced for contact member 49). At the other end, the tension springs 60 and 61 are hung on or suspended at respective shackles or lugs 63 and 64 protruding from the respective support block halves 56 and 57. It is to be understood that the two contact members 49 and 50 can also be connected directly to each other by means of suitable tension springs. This completes the description of the mechanical support of the rotary or movable contacts 28, 29 and 30 in the associated recesses 39, 40 and 41 of the cranked or bent section 35.

Hereinbelow are described the contact-forming elements of the rotary or movable contact 29 or, respectively, of the two contact pieces or members 49 and 50. It can be recognized, especially from FIG. 6 and FIG. 5, that each edge at the short sides of the shell-like, essentially rectangular, contact pieces or members 49 and 50 possesses a relatively great breadth and is substantially flat. In each of these mutually confronting broad edges there is provided a respective rated-current or nominal-current contact surface 65 and 66 FIG. 6. Each of these rated-current or nominal-current contact surfaces 65 and 66 can, for example by means of an inserted section, be formed as a contact lamella strip 67. Such a contact lamella strip 67 can be formed approximately in relation to FIGS. 1 through 3 of the manner described in German Patent Publication Number 1,286,170. As is shown in FIG. 6, it is advantageous for the lamellae of the contact lamella strip 67 to be placed approximately at right angles to the axis of rotation 31.

At both ends of the rated-current or nominal-current contact surfaces 65 and 66 there are provided precontacts or preliminary contact members 68 and 68' or 69 and 69', which are displaced radially and axially both in relation to the rated-current or nominal-current contact surfaces 65 and 66 and in relation to each other. These precontacts 68 and 68' or 69 and 69' are preferably made of a material which is resistant to burning or arcing, for instance copper-tungsten alloy.

It is to be noted that the precontacts 68 and 68' or 69 and 69' project outward from or beyond the respective rated-current or nominal-current contact surfaces 65 and 66 defined by the associated contact lamella strips 67. The precontacts 68 and 68' (FIGS. 5 and 6) have, for instance, the form of a ball or sphere which, by means of a set-screw 70 (FIG. 5), are held in place in the region adjacent to the rated-current or nominal-current contact surface 65 at the edge of the corresponding contact piece or member 49 or 50. The precontacts 69 and 69' (FIGS. 5 and 6), on the other hand, are, for example, pins which have been pressed into the material and whose projecting ends have the form approximately of a pyramidal stump or frustrum. At the contact members 49 and 50 the precontacts 68 and 68' or 69 and 69' could all be provided at both ends in the form of balls or spheres or in the form of pyramidal stumps or frustrae.

For each of these precontacts 68 and 68' or 69 and 69' a depression on recess 71 or 72 (FIG. 5), is provided, at the facing side of the associated fixed lower contact 23, or respectively, of the fixed upper contact 26. These facing sides face or confront the respective precontacts 68 and 68' or 69 and 69'. The depressions or recesses 71 and 72 have the complementary or female shape of the respective precontacts 68 and 68' or 69 and 69'. The corresponding precontacts 68 and 68' or 69 and 69' only push or project into the respectively corresponding complementary or female depressions or recesses 71 and 72 when the actual end or final switching position is attained. This has the result that before the final switching position has been reached and as soon as this final switching position is left, the precontacts 68 and 68' or 69 and 69' force the two respective contact pieces 49 and 50 apart and the rated-current or nominal-current contact surfaces 65 and 66 also lift away from the associated surface sides of the upper fixed contact 26 or, respectively, of the lower fixed contact 23. This prevents the rated-current or nominal-current contact surfaces 65 and 66 from generating abrading or scoring marks on the facing flat surfaces of the upper fixed contact 26 or the lower fixed contact 23. The axial displacement of the precontacts 68 and 68' or 69 and 69' in relation to the respective confronting rated-current or nominal-current 65 and 66 has the result that any rolling or scoring tracks, which may have been generated or left by the precontacts 68 and 68' or 69 and 69' on the confronting substantially flat surfaces of the upper fixed contact 26 and lower fixed contact 23, do not cross, or hardly cross, the area of the flat sides of these fixed contacts. These flat sides are touched or wiped by the rated-current or nominal-current contact surfaces 65 and 66. The radial displacement of the precontacts 68 and 68' or 69 and 69' with respect to each other makes possible a clear-cut correlation of the depression or recesses 71 and 72 whih are formed in the confronting flat surfaces of the fixed contacts 22, 23, 24, 25, 26 and 27.

Therefore, the turning or torsion moment or torque which is required for turning or rotating the cranked support 32 and therefore also the rotary or movable contacts 28, 29 and 30 is minimal. One reason for this is that the contact surfaces of the rotary or movable contacts 28, 29 and 30 lie, together with the lower fixed contacts 22, 23 and 24, in the immediate vicinity of the axis of rotation 31. Another reason is that in the turning or rotating movement only the relatively very small surfaces of the precontacts 68 and 68' or 69 and 69' move upon the facing or confronting substantially flat surfaces of the respective fixed contacts 22 through 27. Furthermore, in the herein described rotary isolating switch, the wear which is caused by the abrading movement and the arc or burn traces in the area of the surfaces which provide contact is reduced to a minimum. Finally, a rotation or turning of the rotary or movable contacts 28, 29 and 30 in relation to one another is practically impossible.

As is shown in FIG. 1 the depicted rotating or rotary isolating switch can additionally be constructed as an earthing or grounding switch. For this purpose it is merely necessary to assign a further fixed or stationary earthing or grounding contact to each of the rotary or movable contacts 28, 29 and 30. In FIG. 1 the earthing or grounding contact assigned to the rotary or movable contact 29 is designated by the reference numeral 73. The rotation or turning angle of the cranked support 32 must also be increased.

FIGS. 1 and 2 show the "on" position in which the busbars 13, 14 and 15 are connected with the lower branch conductors 19, 20 and 21. In FIG. 1 the dashed line 74 shows the rotation or turning position or angular orientation of the cranked support 32 in the "off" position in which the lower branch conductors 19, 20 and 21 are disconnected from the busbars 13, 14 and 15. In FIG. 1 the dashed line 75 shows the rotation or turning position or angular orientation of the cranked support 32 in which the lower branch conductors 19, 20 and 21 are not only disconnected from the busbars 13, 14 and 15 but are also earthed or grounded through the associated earthing or grounding contacts exemplified by the contact 73.

While there are shown and described present preferred embodiments of the invention, it is to be distinctly understood that the invention is not limited thereto, but may be otherwise variously embodied and practiced within the scope of the following claims.

Accordingly, what we claim is:

1. A rotary isolating switch, especially an encapsulated rotary isolating switch, comprising:
   at least two fixed contacts for each phase of an electrical current to be switched;
   said at least two fixed contacts comprising a lower and an upper fixed contact;
   one movable contact for each phase of the electrical current to be switched;
   means defining an axis of rotation for at least said one movable contact;
   said one movable contact being rotatable about said axis of rotation;
   said one movable contact being in constant contact with said lower fixed contact;
   said one movable contact being engageable with and disengageable from said upper fixed contact;
   a rotatable cranked support made of electrically insulating material;
   said means defining an axis of rotation further defining an axis of rotation for said rotatable cranked support;
   said rotatable cranked support being rotatable about said axis of rotation;
   said rotatable cranked support supporting said one movable contact;
   said rotatable cranked support having the form of a cranked section at which said one movable contact is supported;
   said rotatable cranked support containing at least one aperture passing through said cranked support at the region of said cranked section and at the region of said movable contact supported thereat;
   said movable contact having an end section associated with said lower fixed contact;
   said lower fixed contact having an end section associated with said one movable contact;
   said one movable contact projecting radially beyond both ends of said aperture in said rotatable cranked support; and
   said axis of rotation of said cranked support passing through said end section of said one movable contact as well as through said end section of said lower fixed contact.

2. A rotary isolating switch, especially an encapsulated rotary isolating switch, comprising:
   at least two fixed contacts for each phase of an electrical current to be switched;
   said at least two fixed contacts comprising a lower and an upper fixed contact;
   one movable contact for each phase of the electrical current to be switched;
   means defining an axis of rotation for at least said one movable contact;
   said one movable contact being rotatable about said axis of rotation;
   said one movable contact being in constant contact with said lower fixed contact;
   said one movable contact being engageable with and disengageable from said upper fixed contact;
   a rotatable cranked support made of electrically insulating material;
   said means defining an axis of rotation further defining an axis of rotation for said rotatable cranked support;
   said rotatable cranked support being rotatable about said axis of rotation;
   said rotatable cranked support supoorting said one movable contact;
   said rotatable cranked support having the form of a cranked section at which said one movable contact is supported;
   said rotatable cranked support containing at least one aperture passing through said cranked support at the region of said cranked section and at the region of said movable contact supported thereat;
   said movable contact having an end section associated with said lower fixed contact;
   said lower fixed contact having an end section associated with said one movable contact;
   said one movable contact projecting radially beyond both ends of said aperture in said rotatable cranked support;
   said axis of rotation of said cranked support passing through said end section of said one movable contact as well as through said end section of said lower fixed contact;
   means defining a pair of shell-like contact members;
   said one movable contact comprises spring means and said pair of shell-like contact members;
   said pair of shell-like contact members comprising two contact members;
   said two contact members being biased together by said spring means such that said two contact members apply a clamping action to associated ones of said lower and upper fixed contacts; and
   said lower and upper fixed contacts each having the form of a knife contact.

3. The rotary isolating switch as defined in claim 2, wherein:
   said two contact members each have two ends;

said two contact members possessing rated-current contact surfaces;

said two contact members each comprising a respective rated-current contact surface of said rated-current contact surfaces and fixed to each of said two ends of said two contact members;

said two contact members each comprising at least one projecting precontact affixed to each of said two ends of said two contact members;

an engagement position defined by said at least one projecting precontact;

said lower and upper fixed contacts each having at least one substantially flat surface confronting said at least one projecting precontact of said two contact members;

said at least one substantially flat surface being provided with a recess corresponding to said at least one projecting precontact of said two contact members; and said at least one projecting precontact projecting into said recess of an associated one of said lower and upper fixed contacts in said engagement position such that said rated-current contact surfaces only make contact with said lower and upper fixed contacts in said engagement position.

4. The rotary isolating switch as defined in claim 3, wherein:
said at least one projecting precontact comprises a burn-resistant material.

5. The rotary isolating switch as defined in claim 4, wherein:
said burn-resistant material comprises a copper-tungsten alloy.

6. The rotary isolating switch as defined in claim 3, wherein:
said at least one projecting precontact and said rated-current contact surfaces are displaced radially in relation to each other.

7. The rotary isolating switch as defined in claim 3, wherein:
said at least one projecting precontact and said rated-current contact surfaces are displaced axially in relation to each other.

8. The rotary isolating switch as defined in claim 2, further including:
a support block;
said support block comprising two support block halves,
an entrainment connection for each of said support block halves effective in a direction extending substantially parllel to said axis of rotation;
each contact member of said two contact members being connected to an associated one of said two support block halves of said support block by means of said entrainment connection;
both of said two support block halves being connected to each other by threaded connection means;
said two support block halves possessing mutually confronting sides;
each support block half of said two support block halves possessing a respective confronting side of said mutual confronting sides;
each said support block half possessing depressions on said confronting side thereof;
at least one support lug formed in said rotatable cranked support at a location opposite an associated one of said depressions;
said depressions in associated ones of said support block halves cooperating to engage over said at least one support lug;
said at least one aperture of said rotatable cranked support having a longitudinal central regions; and
each said at least one support lug being integral with said rotatable cranked support and projecting inwardly along said longitudinal central region of each said at least one aperture of said rotatable cranked support.

9. The rotary isolating switch as defined in claim 8, wherein:
said entrainment connection comprises an entrainment connection pin anchored in an associated one of said two contact members;
each said support block half is provided with an entrainment connection slot; and
said entrainment connection pin penetrating said entrainment connection slot of an associated support block half.

10. The rotary isolating switch as defined in claim 8, further including:
at least one pair of tension springs; and
each said contact member of said two contact members of said pair of shell-like contact members is connected to an associated support block half of said support block by said at least one pair of tension springs.

11. The rotary isolating switch as defined in claim 8, further including:
at least one pair of tension springs; and
each said contact member of said two contact members of said pair of shell-like contact members is connected by said at least one pair of tension springs to the other contact member of said two contact members of said pair of shell-like contact members.

12. The rotary isolating switch as defined in claim 3, wherein:
said precontact contains two substantially flat inclined surfaces; and
said two substantially flat inclined surfaces each facing in opposite directions of rotation of said one movable contact.

13. The rotary isolating switch as defined in claim 3, wherein:
said precontact contains two curved inclined surfaces; and
said two curved inclined surfaces each facing in opposite directions of rotation of said one movable contact.

14. The rotary isolating switch as defined in claim 3, wherein:
each end of said two ends of each of said two contact members is provided with a pair of precontacts;
said pair of precontacts comprising a first precontact and a second precontact;
said one movable contact being rotatable about said axis of rotation in first and second directions of rotation opposite to one another;
said first precontact being arranged ahead of said rated-current contact surface in said first direction of rotation; and
said second precontact being arranged ahead of said rated-current contact surface in said second direction of rotation.

15. The rotary isolating switch as defined in claim 3, wherein:

said rated-current contact surfaces are formed of contact lamella strips; and said contact lamella strips being inserted in an associated end of each of said contact members.

16. The rotary isolating switch as defined in claim 15, wherein:

said contact lamella strips comprise contact lamellae; and said contact lamellae of said contact lamella strips extending essentially parallel to a direction extending radial to said axis of rotation.

* * * * *